United States Patent [19]

Zettier et al.

[11] Patent Number: 4,946,698

[45] Date of Patent: Aug. 7, 1990

[54] METHOD OF PRECIPITATING CHEESE FINES FROM WHEY

[75] Inventors: Karl H. Zettier, Oelde; Siegfried Klapper, Herzebrock-Clarpholz; Hartwig Fritze, Weingarten; Reinhard Meyer, Munich, all of Fed. Rep. of Germany

[73] Assignee: Westfalia Separator AG, Oelde, Fed. Rep. of Germany

[21] Appl. No.: 209,829

[22] Filed: Jun. 22, 1988

[30] Foreign Application Priority Data

Jun. 25, 1987 [DE] Fed. Rep. of Germany ....... 3720961

[51] Int. Cl.[5] ........................ A23C 21/00; A23C 19/00

[52] U.S. Cl. ..................................... 426/495; 426/491

[58] Field of Search ............... 426/581, 584, 586, 491, 426/495

[56] References Cited

U.S. PATENT DOCUMENTS 3,707,770 1/1973 Timmons et al. .................. 426/491

OTHER PUBLICATIONS

Lehmann, H., Whey Processing Lines, 3rd Ed. Westfalia Separator Ag. West Germany, 1988, p. 19.

*Primary Examiner*—Donald E. Czaja

*Assistant Examiner*—Helen Pratt

*Attorney, Agent, or Firm*—Sprung Horn Kramer & Woods

[57] ABSTRACT

A method of precipitating cheese fines from whey by using a self-emptying centrifuge, wherein the clarified whey is continuously extracted and the cheese fines are intermittently extracted. The cheese fines are intercepted by a solids collector and rinse is supplied to the solids collector. The rinse will not change the structure of the cheese fines and clarified and heated whey is accordingly employed as a rinse in the centrifuge.

3 Claims, 2 Drawing Sheets

1
2
3
4
5
6
7
8
9
10
11
12
13
14
Westfalia Separator

Westfalia Separator

METHOD OF PRECIPITATING CHEESE FINES FROM WHEY

BACKGROUND OF THE INVENTION

The invention concerns a method of precipitating cheese fines from whey by means of a self-emptying centrifuge, whence the clarified whey is continuously extracted and the cheese fines are intermittently extracted, whereby the cheese fines are intercepted by a solids collector and rinse is supplied to the solids collector.

A method of this type is known. Rinse in the form of cold water is injected into the space demarcated by the centrifuge hood above the solids collector and the centrifuged cheese fines are rinsed out of the solids collector.

The treatment with cold rinse water subjects the cheese fines to a structural change to the detriment of both its further processing into a cheese product and of its yield.

The cheese fines assume the structure of shredded coconut. Its particles are hard and can be compressed into a cake only with difficulty. The finer particles are more easily rinsed away from the coarser ones and get lost in the form of dust.

A cheese fine with this structure can only be converted into a processed cheese by the addition of emulsifying salt and does not sell for very much money.

It is impossible to spin the cheese fines, to liquefy and plastify them in hot water while kneading them, that is, although spun cheese dust can be sold at a higher price than processed cheese.

SUMMARY OF THE INVENTION

The object of the invention is accordingly to improve a method of the aforesaid type to the extent that the rinse will not change the structure of the cheese fines.

This object is attained in that clarified and heated whey is employed as a rinse in the centrifuge.

The cheese fines extracted from the centrifuge in the method in accordance with the invention lacks the shredded coconut structure. In addition to improved spinning capacity, the cheese fines are distinguished by a lighter and more attractive color. An increase in the yield of probably 10–20% has also been detected.

Furthermore, the method in accordance with the invention prevents or extensively reduces foaming in the whey collector.

The whey employed as a rinse can have a temperature of approximately 30 to 40° C.

The centrifuge drum can be partly emptied at intervals of approximately five minutes.

A magnetic valve that supplies rinsing whey can be opened approximately three seconds before the drum is partly emptied and closed approximately six seconds after the drum is emptied.

The mixture of cheese fines and whey can be supplied from the solids collector to a rotating brush strainer, the whey can be extracted with a pump and conveyed into an outlet line in the centrifuge for clarified whey, and the cheese fines can flow into a reservoir with a slide controlled connection left open.

DETAILED DESCRIPTION OF THE INVENTION

Figure 1:
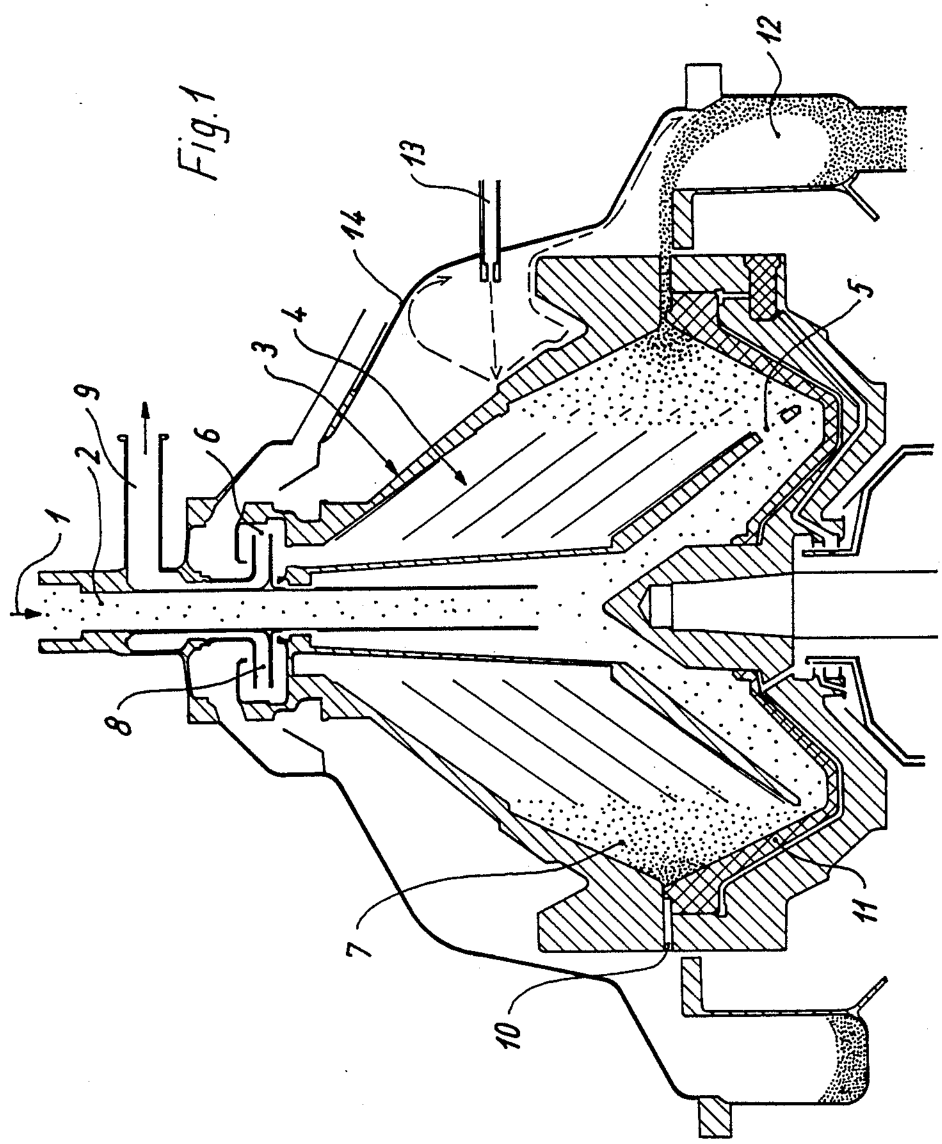
FIG. 1 is a vertical section through a self-emptying centrifuge, illustrating piston slides that close off openings for extracting the cheese fines closed on the left and open on the right.

Referring now to FIG. 1, raw whey is supplied to the stationary intake 2 of a centrifuge drum 3 in the direction indicated by arrow 1. Since cheese fines often have the property of being present in the form of floating particles in the centrifugal field of the centrifuge, the raw whey is supplied to a riser 5 in the periphery of a nest 4 of disks, with the result that the whey is subject to a very powerful centrifugal force as it enters the nest. The liquid that is to be clarified must flow against the centrifugal force in the gap between the disks in order to arrive in a peeling chamber 6 from the drum. Even extremely fine particles are precipitated.

The particles of cheese fines collect in solids space 7. The clarified whey, which is at a temperature of between 30° and 40°C, flows continuously out over a peeling disk 8 through a line 9.

Figure 2:
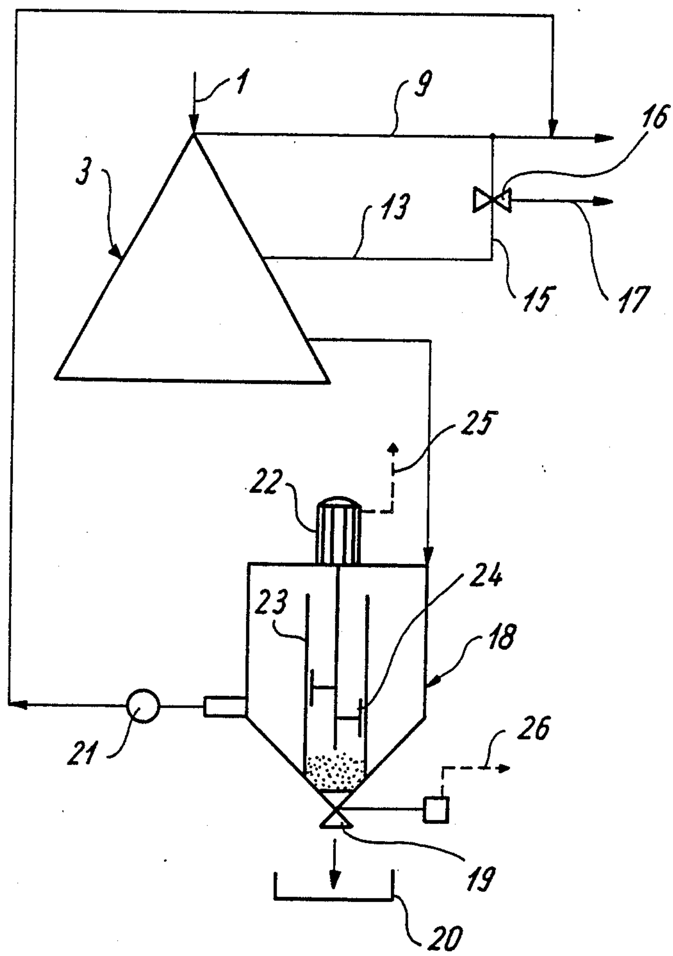
FIG. 2 is a schematic drawing of a purifying centrifuge and an associated rotating brush strainer with a closed whey circulating system.

In the jacket of drum 3 and at its longest inside diameter are openings 10 through which the cheese fines are extracted. The extraction openings can be closed off by a piston slide 11 inside the drum. The left side of FIG. 1 illustrates piston slide 11 in the closure position. The right side of FIG. 1 illustrates the slide in the open position, whereby the particles of cheese dust can be centrifuged out into an annular solids interceptor 12. Rinse in the form of clarified whey is introduced through a connection 13 into a space above solids interceptor 12 and demarcated on the outside by a hood 14. The whey is obtained from line 9 through a branch 15 that accommodates a magnetic valve 16 (FIG. 2). The valve is activated by controls (not shown), to which a function line 17 leads.

Piston slide 11 is, when the centrifuge is in operation, moved into the open position approximately every five minutes, initiating partial emptying of the drum.

To maintain the volume of clarified whey that is employed as a rinse low, magnetic valve 16 is opened approximately three seconds before the drum is emptied and closed approximately six seconds after the drum has been emptied.

In the embodiment illustrated in FIG. 2, the mixture of cheese fines and whey is conveyed from solids interceptor 12 to a rotating-brush strainer 18. The particles of cheese fines settle at the bottom of the strainer, are extracted by way of a slide 19, and are intercepted in a reservoir 20. The reservoir is emptied manually from time to time, which does not cause any problems because only approximately 12 kg of cheese fines are supplied to it per hour.

Each partial emptying of the centrifuge drum yields approximately 5:1 of a mixture of cheese fines and (whey protein) whey, with a dry substance of 8%. Since the mixture cannot be processed as is into cheese, it is conveyed to rotating brush strainer 18, where as previously described herein, it is allowed to settle. The separated whey is supplied to line 9 through a pump 21. The pump is activated by a level sensor that controls the volume of material in the strainer. The motor 22 that powers the strainer is always turned on for a few seconds just before the drum is emptied to allow brushes 24 to scrape off the particles of cheese fines adhering to the walls 23 of the strainer and ready it for the next straining process.

Valve 19 and motor 22 are activated by controls, to which function lines 25 and 26 lead.

It will be appreciated that the instant specifications and claims are set forth by way of illustration and not limitation, and that various modifications and changes may be made without departing from the spirit and scope of the present invention.

What is claimed is:

1. In a method of precipitating cheese fines from whey by means of a self-emptying centrifuge, wherein clarified whey is continuously extracted from the centrifuge, cheese fines are intermittently extracted from the centrifuge, the cheese fines are intercepted by a solids collector in a drum and rinse is supplied to the solids collector, the improvement comprising partly emptying the centrifuge drum at intervals of approximately five minutes and heating clarified whey to a temperature of approximately 30° to 40° C. and rinsing the solids collector in the centrifuge drum with the heated clarified whey.

2. A method as in claim 1, wherein rinsing whey is supplied through a magnetic valve that is opened approximately three seconds before the drum is partly emptied and closed approximately six seconds after the drum has been emptied.

3. A method as in claim 1, wherein a mixture of cheese fines and whey is supplied from the solids collector to a rotating brush strainer, the whey is extracted with a pump and conveyed into an outlet line in the centrifuge for clarified whey, and the cheese fines flow into a reservoir through an open slide-controlled connection.

* * * * *